(12) United States Patent
Koizumi

(10) Patent No.: US 8,029,175 B2
(45) Date of Patent: Oct. 4, 2011

(54) VEHICLE LIGHTING APPARATUS

(75) Inventor: Hiroya Koizumi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 333 days.

(21) Appl. No.: 12/468,682

(22) Filed: May 19, 2009

(65) Prior Publication Data

US 2009/0290370 A1 Nov. 26, 2009

(30) Foreign Application Priority Data

May 22, 2008 (JP) .................................. 2008-134416

(51) Int. Cl.
*B60Q 1/56* (2006.01)
(52) U.S. Cl. ........................ 362/497; 362/231; 348/148
(58) Field of Classification Search .................. 362/497; 348/148
See application file for complete search history.

(56) References Cited

U.S. PATENT DOCUMENTS

| | | | | |
|---|---|---|---|---|
| 5,219,217 A | * | 6/1993 | Aikens ........................... | 362/560 |
| 7,111,968 B2 | * | 9/2006 | Bauer et al. .................... | 362/503 |
| 2004/0160786 A1 | | 8/2004 | Bauer et al. | |
| 2005/0093684 A1 | * | 5/2005 | Cunnien ........................ | 340/435 |
| 2005/0243172 A1 | * | 11/2005 | Takano et al. ................. | 348/148 |

FOREIGN PATENT DOCUMENTS

EP 1886871 A1 2/2008
JP 2007-145048 A 6/2007

OTHER PUBLICATIONS

European Search Report in European Application No. 09160827.3 dated Nov. 23, 2009, 5 pages.
Patent Abstracts of Japan, Publication No. 2007-145048, Publication Date: Jun. 14, 2007, 1 page.

* cited by examiner

*Primary Examiner* — Evan Dzierzynski
(74) *Attorney, Agent, or Firm* — Osha • Liang LLP

(57) ABSTRACT

A lighting apparatus is disposed near an upper end edge of a license plate on a rear side of a vehicle. The lighting apparatus includes a license plate lamp which illuminates the license plate with visible light, and an infrared irradiation lamp which irradiates a region behind the vehicle with infrared light. The license plate lamp includes a first light emitting device which emits the visible light and is supported on a rear surface of a first support plate. The infrared irradiation lamp includes a second light emitting device which emits the infrared light and is supported on a lower surface of a second support plate. A lower end of the first support plate is coupled to a rear end of the second support plate. When seen from behind the vehicle, the license plate lamp is disposed directly above the infrared irradiation lamp.

18 Claims, 5 Drawing Sheets

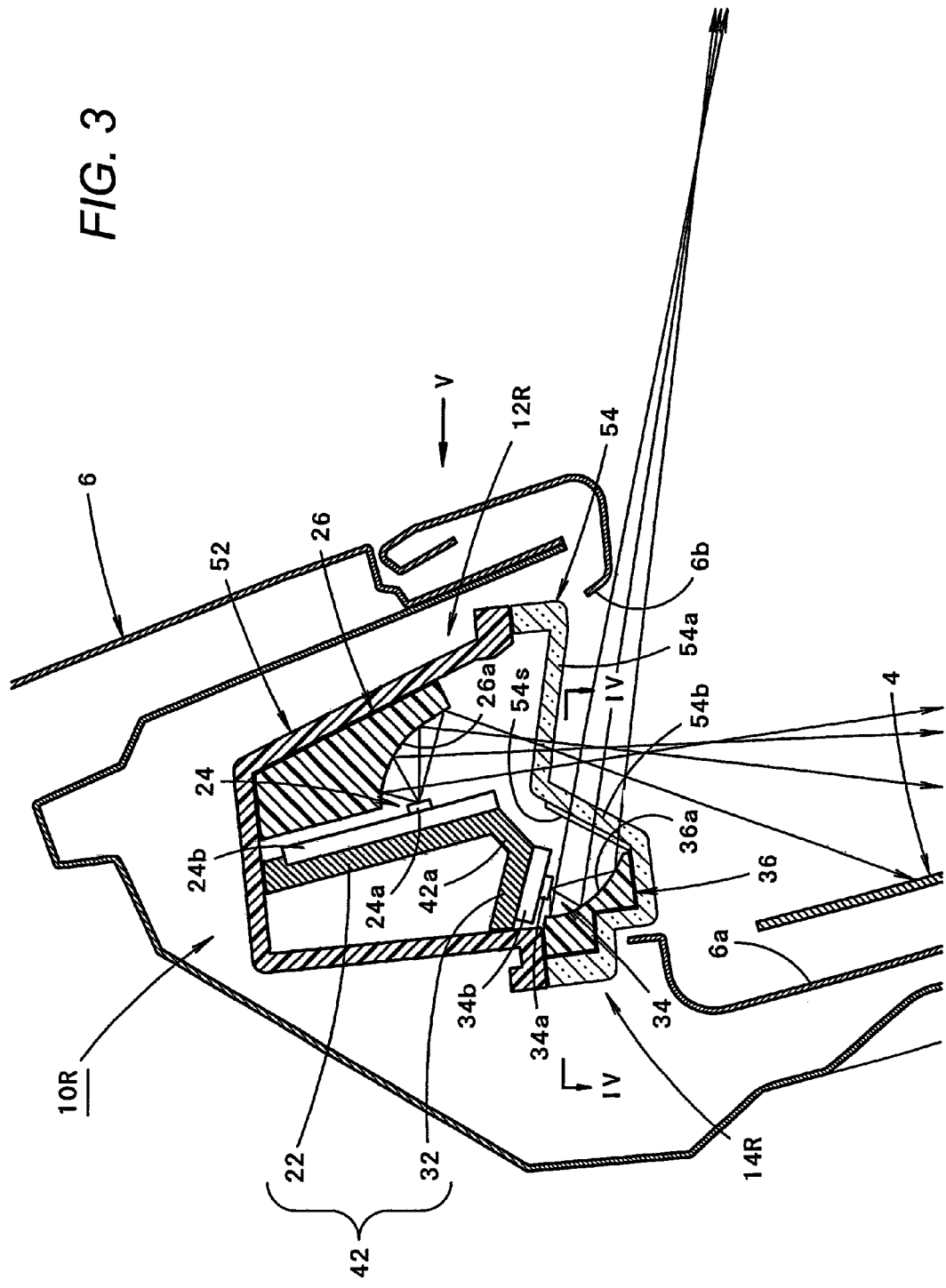

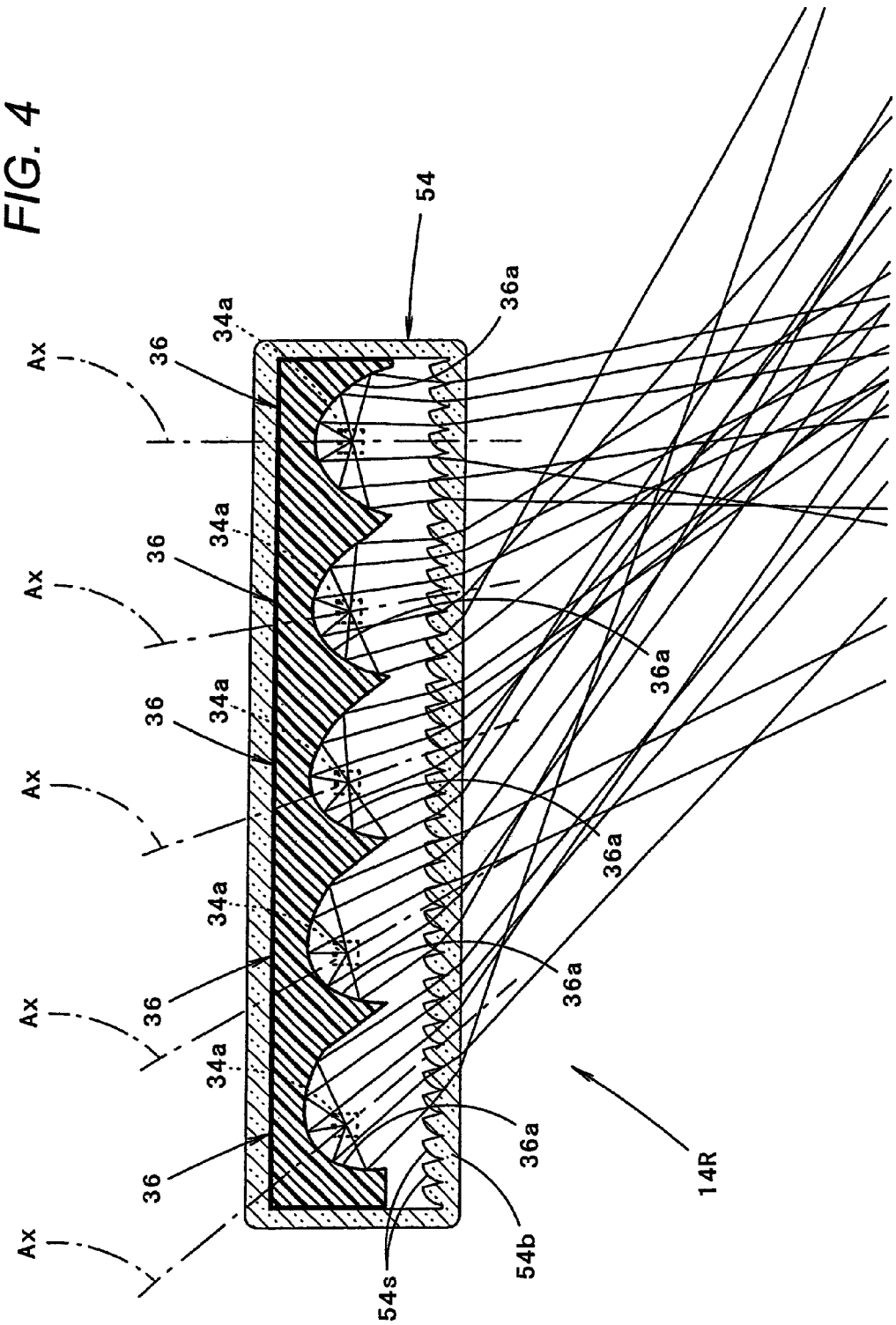

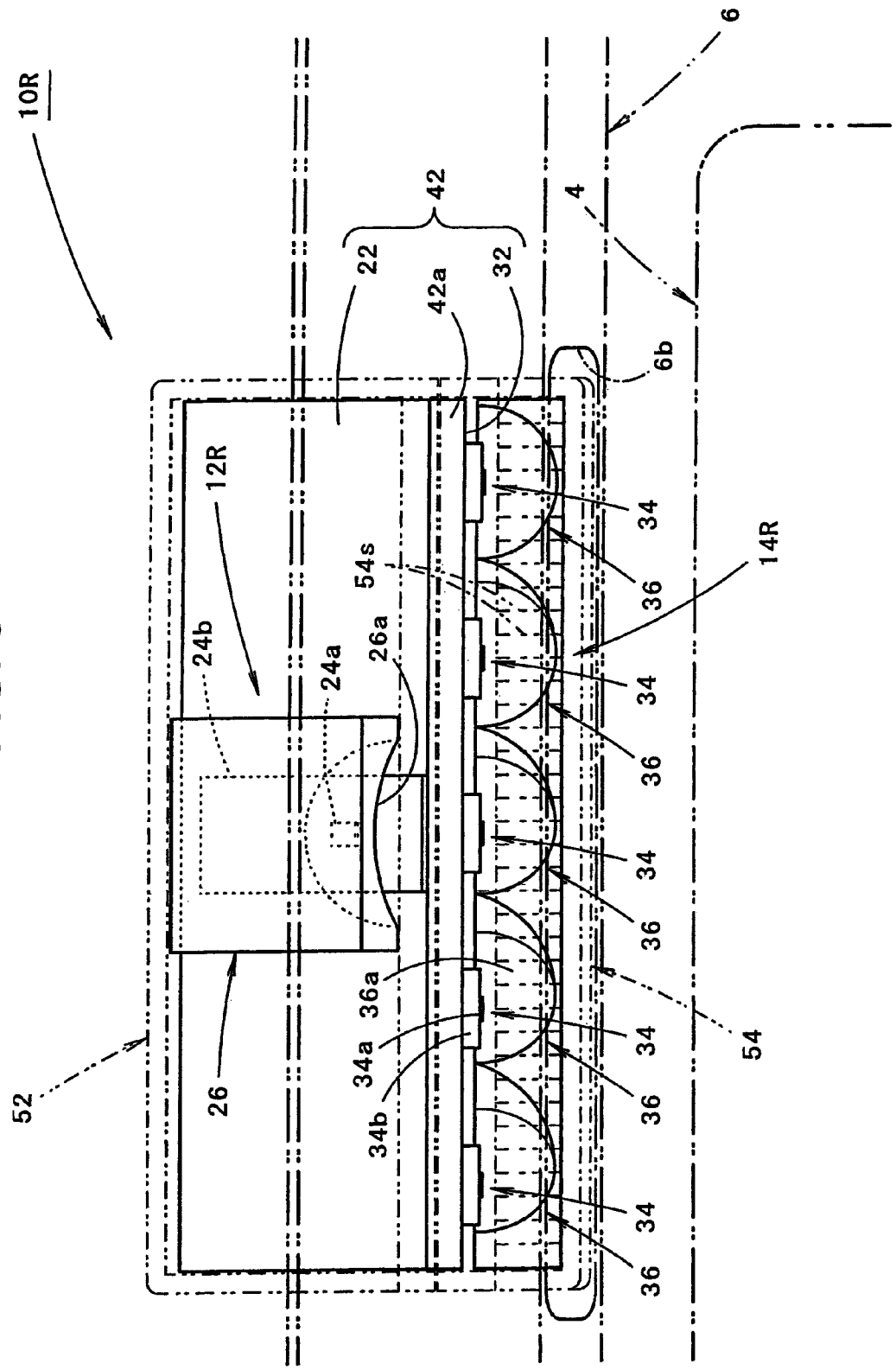

VEHICLE LIGHTING APPARATUS

CROSS-REFERENCE TO RELATED APPLICATIONS

The present application claims priority from Japanese Patent Application No. 2008-134416 filed on May 22, 2008, the entire contents of which is incorporated herein by reference.

BACKGROUND OF INVENTION

1. Field of the Invention

The present invention relates to a vehicle lighting apparatus, which is disposed near an upper end edge of a license plate, having a license plate lamp and an infrared irradiation lamp.

2. Related Art

A related art license plate lamp, which is disposed near an upper end edge of the license plate, illuminates a license plate on a rear side of a vehicle with visible light.

A related art lane mark irradiating lamp, which is an infrared irradiation lamp, irradiates an obliquely rear region of a road surface behind the vehicle with infrared light. While being irradiated with the infrared light, an image of the road surface behind the vehicle is captured by an infrared camera and is displayed on a monitor. Thus, lane marks (e.g., right and left white lines extending along the lane on which the vehicle is running) can be recognized. This may be used for an automatic driving control of the vehicle.

Generally, these license plate lamp and lane mark irradiating lamp are separately provided in a rear part of the vehicle.

A related art lighting apparatus includes a license plate lamp and a back monitoring lamp, which are both arranged near an upper end edge of a license plate (see, e.g., JP 2007-145048 A). This back monitoring lamp is also an infrared irradiation lamp, but is different from the lane mark irradiating lamp in that, for example, it irradiates a wider range of a road surface behind the vehicle with infrared light.

If the back monitoring lamp is replaced with a lane mark irradiating lamp in the related art lighting apparatus described above, the license plate lamp and the lane mark irradiating lamp will be disposed near the upper end edge of the license plate so as to be configured as a single lighting apparatus.

However, if the back monitoring lamp is simply replaced with a lane mark irradiating lamp in the related art lighting apparatus described above, following problems will occur.

The back monitoring lamp is turned on when capturing an image of the road surface behind the vehicle with an infrared camera during a backing movement of the vehicle. In contrast, the lane mark irradiating lamp is continuously turned on during the night time, for example, to execute an automatic driving control. The lane mark irradiating lamp uses near-infrared light. Thus, irradiation light of the lane mark irradiating lamp partially contains red light. Accordingly, when the lane mark irradiating lamp is turned on during the night time and is seen from behind the vehicle, the lane mark irradiating lamp looks reddish. This gives a strange feeling to drivers of vehicles following behind.

During the night time, the license plate lamp is also continuously turned on. Therefore, if the lane mark irradiating lamp is disposed adjacently below the license plate lamp, the light from the license plate lamp can effectively suppress the lane mark irradiating lamp from looking reddish.

However, in the related art lighting apparatus described above, the back monitoring lamp is configured such that a lens is disposed to control the infrared light emitting from a backwardly facing light emitting device. Thus, if the license plate lamp is disposed adjacently above the back monitoring lamp, the light from the license plate lamp will partially be blocked or becomes uncontrollable due to the light emitting device and the lens of the back monitoring lamp. Therefore, in the related art lighting apparatus described above, the license plate lamp and the back monitoring lamp are spaced from each other in a widthwise direction of the vehicle.

Accordingly, if the back monitoring lamp is simply replaced with a lane mark irradiating lamp in the related art lighting apparatus, there will a problem that the light from the license plate lamp cannot be utilized to suppress the lane mark irradiating lamp from looking reddish.

SUMMARY OF INVENTION

One or more embodiments of the present invention provide a vehicle lighting apparatus in which a license plate lamp and an infrared irradiation lamp are both disposed near an upper end edge of a license plate, and in which light from the license plate lamp effectively suppresses the infrared irradiation lamp from looking reddish.

According to an aspect of the present invention, a lighting apparatus is disposed near an upper end edge of a license plate on a rear side of a vehicle. The lighting apparatus includes a license plate lamp which illuminates the license plate with visible light, and an infrared irradiation lamp which irradiates a region behind the vehicle with infrared light. The license plate lamp includes a first support plate having a rear surface facing backward, a first light emitting device which emits the visible light and is supported on the rear surface of the first support plate, and a first optical member which controls the visible light emitted from the first light emitting device so as to be directed toward the license plate. The infrared irradiation lamp includes a second support plate having a lower surface facing downward, a second light emitting device which emits the infrared light and is supported on the lower surface of the second support plate, and a second optical member which controls the infrared rays emitted from the second light emitting device so as to be directed backward toward the region behind the vehicle. A lower end of the first support plate is coupled to a rear end of the second support plate. When seen from behind the vehicle, the license plate lamp is disposed directly above the infrared irradiation lamp.

Each of the "first light emitting device" and the "second light emitting device" serves as a light source and has a surface-emitting chip which emits light substantially in a dot-shape. The type of the light emitting device is not particularly limited, e.g., a light emitting diode or a laser diode may be used.

A configuration of the "first optical member" is not particularly limited in so far as it controls the visible light from the first light emitting device so as to be directed toward the license plate.

A configuration of the "second optical member" is not particularly limited in so far as it controls the infrared light from the second light emitting device so as to be directed backward from the vehicle.

Other aspects and advantages of the present invention will be apparent from the following description, the drawings, and the claims.

BRIEF DESCRIPTION OF DRAWINGS

FIG. 3 is an enlarged view of the portion III in FIG. 2;

FIG. 4 is a sectional view taken along the line IV-IV in FIG. 3; and

FIG. 5 is a view seen in the direction V in FIG. 3, with a lamp body and a transparent cover being removed.

DETAILED DESCRIPTION

Hereinafter, embodiments of the present invention will be described in detail with reference to the drawings. The following embodiments are merely exemplary, while the appended claims are intended to define the scope of the present invention.

Figure 1:
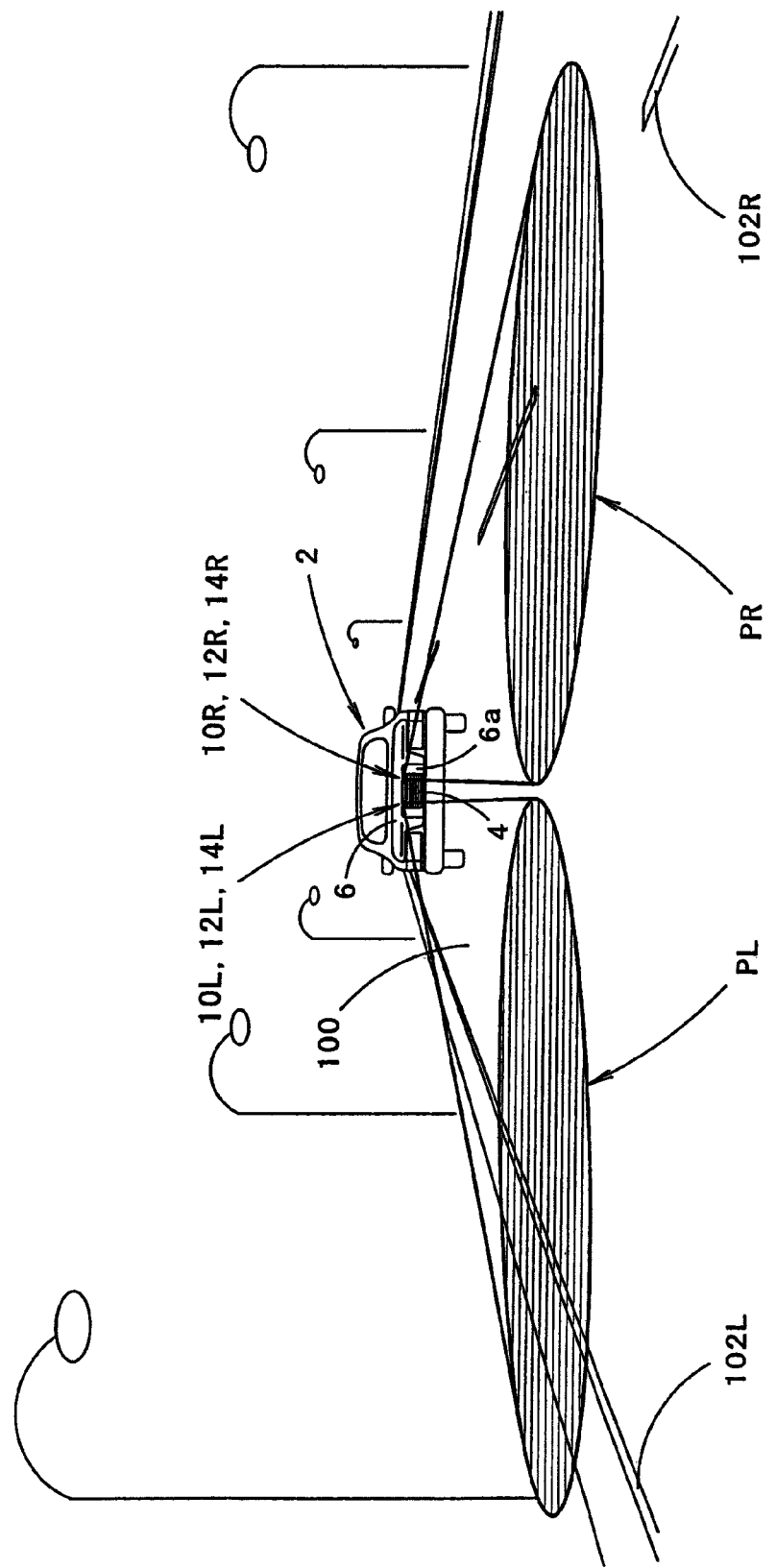
FIG. 1 is a rear perspective view of a vehicle on which a pair of right and left lighting apparatuses according to one or more embodiments of the present invention is mounted.

FIG. 1 is a rear perspective view of a vehicle 2 on which a pair of right and left lighting apparatuses 10R, 10L are mounted. FIG. 1 illustrates a state in which the vehicle 2 is running on a lane 100.

As shown in FIG. 1, the right and left lighting apparatuses 10R, 10L are disposed near an upper end edge of a license plate 4, which is provided on a rear side of the vehicle 2.

The right and left lighting apparatuses 10R, 10L are symmetrically located with respect to a center of the vehicle 2 in a widthwise direction of the vehicle 2, and have a bilaterally symmetric configuration.

The left-side lighting apparatus 10L is disposed near an upper left corner of the license plate 4. The lighting apparatus 10L includes a license plate lamp 12L, which illuminates the license plate 4 with visible light, and a lane mark irradiating lamp 14L (an infrared irradiation lamp), which irradiates an obliquely left region of a road surface behind the vehicle 2 with infrared light.

The right-side lighting apparatus 10R is disposed near an upper right corner of the license plate 4. The lighting apparatus 10R includes a license plate lamp 12R, which illuminates the license plate 4 with visible light, and a lane mark irradiating lamp 14R (an infrared irradiation lamp), which irradiates an obliquely right region of the road surface behind the vehicle 2 with infrared light.

The infrared light from the lane mark irradiating lamp 12L of the left-side lighting apparatus 10L forms an infrared light distribution pattern PL on the obliquely left region of the road surface including a lane mark 102L on the left side of the lane 100 on which the vehicle 2 is running. The infrared light from the lane mark irradiating lamp 12R of the right-side lighting apparatus 10R forms another infrared light distribution pattern PR on the obliquely right region of the road surface including another lane mark 102R on the right side of the lane 100 on which the vehicle 2 is running.

While being irradiated with the infrared lights from the lane mark irradiating lamps 14R, 14L, an image of the road surface behind the vehicle 2 is captured by an infrared camera (not shown) mounted on the vehicle 2, and is displayed on a monitor so that the lane marks 102R, 102L are recognizable. This may be used for an automatic driving control of the vehicle 2.

Because the right and left lighting apparatuses 10R, 10L have a bilaterally symmetric configuration as described above, detailed description will be given below mainly in connection with the right-side lighting apparatus 10R. Those skilled in the art will appreciate that the description of the right-side lighting apparatus 10R will apply analogously to the left-side lighting apparatus 10L.

Figure 2:
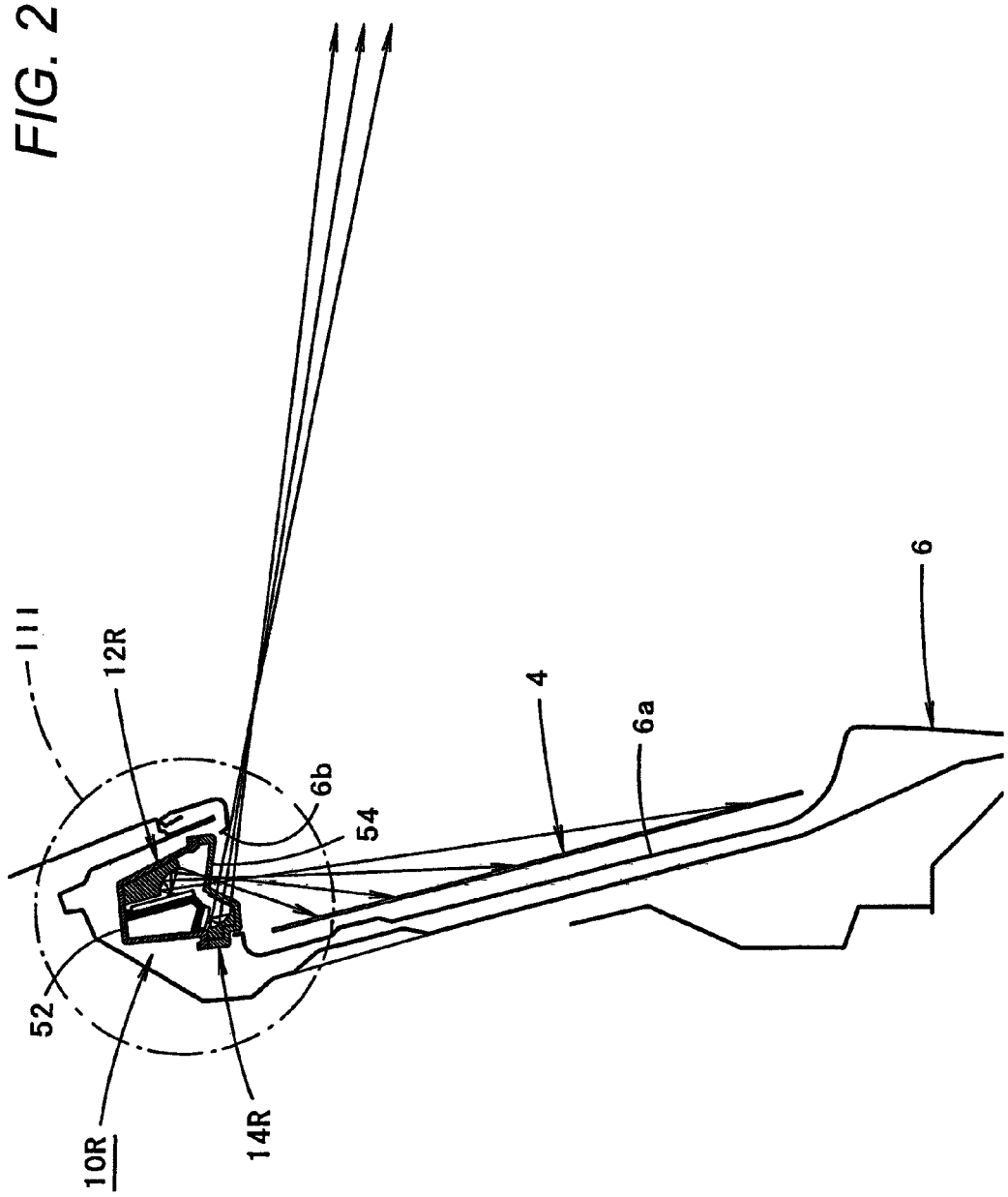
FIG. 2 is a side sectional view of the right-side lighting apparatus.

FIG. 2 is a side sectional view of the right-side lighting apparatus 10R, FIG. 3 is an enlarged view of the portion III in FIG. 2, FIG. 4 is a sectional view taken along the line IV-IV in FIG. 3, and FIG. 5 is a view seen in the direction V in FIG. 3.

As shown in these drawings, the lighting apparatus 10R includes a downwardly opened lamp body 52 and a transparent cover 54 attached to a portion of the lamp body 52 around the opening to form a lamp chamber together with the lamp body 52. The license plate lamp 12R and the lane mark irradiating lamp 14R are disposed inside the lamp chamber.

FIG. 5 illustrates a state in which the lamp body 52 and the transparent cover 54 are removed from the vehicle lighting apparatus 10R.

As shown in FIG. 3, the lighting apparatus 10R is disposed inside an internal space of a trunk lid 6 and above a recessed portion 6a of the trunk lid 6. An upper wall of the recessed portion 6a is formed with an opening portion 6b from which the transparent cover 54 of the lighting apparatus 10R faces an external space of the trunk lid 6.

The license plate lamp 12R includes a first support plate 22 which is arranged such that a rear surface of first support plate 22 faces substantially backward, a first light emitting device 24 which emits visible light and is supported on the rear surface of the first support plate 22, and a first reflector 26 (a first optical member) which controls the visible light from the first light emitting device 24 so as to be directed toward the license plate 4.

The lane mark irradiating lamp 14R includes a second support plate 32 which is arranged such that a lower surface of second support plate 32 faces substantially downward, a second light emitting device 34 which emits infrared light and is supported on the lower surface of the second support plate 32, and a second reflector 36 (a second optical member) which controls the infrared light from the second light emitting device 34 so as to be directed backward from the vehicle 2. In one or more embodiments, the lane mark irradiating lamp 14R includes five sets of the second light emitting device 34 and the second reflector 36, arranged along the widthwise direction of the vehicle 2. The second light emitting device 34 of each of the five sets are supported on the same second support plate 32.

As shown in FIG. 5, when seen from behind the vehicle 2, the first light emitting device 24 of the license plate lamp 12R is positioned substantially directly above the second light emitting device 34 of the set in the lane mark irradiating lamp 14R that is located in the center in the widthwise direction of the vehicle 2.

A lower end of the first support plate 22 of the license plate lamp 12R and a rear end of the second support plate 32 of the lane mark irradiating lamp 14R are connected to each other to form a single support plate member 42. In other words, the first support plate 22 and the second support plate 32 are formed as a one-piece structure.

In one or more embodiments, the support plate member 42 is made from a metallic plate, and is configured to have a substantially V-shaped section and to extend in the widthwise direction of the vehicle 2. More specifically, the first plate 22 is slightly inclined with respect to a vertical plane such that the rear surface of the first plate 22 faces slightly upward, and the second plate 32 is slightly inclined with respect to a horizontal plane such that the lower surface of the second plate 32 faces slightly forward. Thus, the first support plate 22 and the second support plate 32 form an acute angle therebetween. The first support plate 22 and the second support plate 32 are coupled via a connecting portion 42. The connecting portion 42 extends obliquely upward in the backward direction from the rear end of the second support plate 32.

The first light emitting device 24 of the license plate lamp 12R is a white light emitting diode, and includes a light emitting chip 24a having a rectangular light emitting surface and a substrate 24b on which the light emitting chip 24a is supported. The light emitting chip 24a is sealed by a thin film so as to cover the light emitting surface of the light emitting chip 24a. The first light emitting device 24 is positioned and supported with respect to the first support plate 22 via the substrate 24b.

The first reflector 26 of the license plate lamp 12R is a resin-made block and is fixed to the lamp body 52. A reflecting surface 26a of the first reflector 26 is curved in an ellipsoidal shape having a first focal point at the light emitting center of the first light emitting device 24. The visible light emitted from the first light emitting device 24 is downwardly reflected by the reflecting surface 26a of the first reflector 26 to converge and then to diffuse toward the license plate 4.

On the other hand, each of the second light emitting devices 34 of the lane mark irradiating lamp 14R is an infrared light emitting diode, and includes a light emitting chip 34a having a rectangular light emitting surface and a substrate 34b on which the light emitting chip 34a is supported. The light emitting chip 34a is sealed by a thin film so as to cover the light emitting surface of the light emitting chip 34a. Each of the second light emitting devices 34 is positioned and supported with respect to the second support plate 32 via their respective substrates 34b.

The second reflectors 36 of the lane mark irradiating lamp 14R are formed as a one-piece structure of a resin-made block which is fixed to the lamp body 52. A reflecting surface 36a of each of the second reflectors 36 is curved in an ellipsoidal shape having a first focal point at the light emitting center of the corresponding second light emitting device 34. The infrared light emitted from each of the second light emitting device 34 is backwardly and slightly downwardly reflected by the reflecting surface 36a of the corresponding second reflector 36 to converge and then to diffuse toward the road behind the vehicle 2.

As shown in FIG. 4, the second reflectors 36 of the lane mark irradiating lamp 14R are configured such that, as the location of the second reflector 36 becomes closer to the center of the vehicle 2 in the widthwise direction of the vehicle 2, an optical axis Ax of the second reflectors 36 is directed more outwardly in the widthwise direction of the vehicle 2. More specifically, the optical axis Ax of the second reflector 36 located at a most outward position in the widthwise direction of the vehicle 2 is directed in the backward direction of the vehicle 2, the optical axis Ax of the second reflector 36 located at a most inward position in the widthwise direction of the vehicle 2 is inclined about 45° outwardly with respect to the backward direction of the vehicle 2, and the outward inclination angles of the optical axes Ax of the remaining three second reflectors 36 gradually decreases as the location thereof becomes more outward in the widthwise direction of the vehicle 2.

As shown in FIG. 3, the transparent cover 54 includes a first transparent portion 54a through which the visible light emitted from the first light emitting device 24 and reflected by the first reflector 26 is transmitted, and a second transparent portion 54b through the infrared light emitted from the second light emitting devices 34 and reflected by the second reflectors 36 is transmitted.

The first transparent portion 54a extends backward and slightly downward from a location near the lower end of the first support plate 22. The second transparent portion 54b extends downward and slightly forward from a location near the rear end of the second support plate 32.

A plurality of striped lens elements 54s are formed on an inner surface of the second transparent portion 54b. These lens elements 54s deflect and diffuse the infrared light emitted from the second light emitting devices 34 and reflected by the second reflectors 36. More specifically, the lens elements 54s outwardly deflect the infrared light in the widthwise direction of the vehicle 2 and then diffuse the deflected infrared light in the horizontal direction.

As described above, the opening portion 6b is formed in the upper wall of the recessed portion 6a of the trunk lid 6, and the transparent cover 54 is arranged to face the external space of the trunk lid 6 through the opening portion 6b. When seen from behind the vehicle 2, most parts of the vehicle lighting apparatus 10R, other than a lower end portion of the second transparent portion 54b, are covered by the trunk lid 6 and, thus, cannot be seen from outside.

Next, advantages according to the embodiments described above will be described.

The license plate lamp 12R and the lane mark irradiating lamp 14R of the right-side lighting apparatus 10R are disposed near the upper end edge of the license plate 4 on the rear side of the vehicle 2. More specifically, the license plate lamp 12R which illuminates the license plate 4 from above with the visible light is arranged adjacently above the lane mark irradiating lamp 14R which irradiates the obliquely right region of the road surface behind the vehicle 2 with the infrared light. That is, when seen from behind the vehicle 2, the lane mark irradiating lamp 14R is disposed directly above the license plate lamp 12R. Therefore, the visible light from the license plate lamp 12R can effectively suppress the lane mark irradiating lamp 14R from looking reddish.

More specifically, the license plate lamp 12R is configured such that the first light emitting device 24 is supported on the backwardly facing rear surface of the first support plate 22, the lane mark irradiating lamp 14R is configured such that the second light emitting device 34 is supported on the downwardly facing lower surface of the second support plate 32, and the lower end of the first support plate 22 is coupled to the rear end of the second support plate 32. According to this configuration, while the license plate lamp 12R and the lane mark irradiating lamp 14R are disposed adjacently to each other, the visible light emitted from the first light emitting device 24 is controlled by the first reflector 26 (the first optical member) is directed toward the license plate 4 without being blocked by the components of the lane mark irradiating lamp 14R, and the infrared light emitted from the second light emitting device 34 is controlled by the second reflector 36 (the second optical member) is directed backwardly toward a region behind the vehicle without being blocked by the components of the license plate lamp 12R.

Accordingly, it is possible to utilize the visible light from the license plate lamp 12R to effectively suppress the lane mark irradiating lamp 14R from looking reddish, thereby eliminating a problem of giving a strange feeling to drivers of vehicles following behind.

Further, because the license plate lamp 12R and lane mark irradiating lamp 14R are disposed adjacently to each other, the vehicle lighting apparatus 10R can be made compact.

Further, because the first support plate 22 and the second support plate 32 are formed as a single piece of metallic support plate member 42, the support plate member 42 can additionally function as a common heat sink for the first light emitting device 24 and the second light emitting device 34.

According to the embodiments described above, moreover, the first reflector 26 (the first optical member) is arranged behind the first support plate 22, and includes the reflecting surface 26a which downwardly reflects the visible light emitted from the first light emitting device 24. Thus, the visible light from the first light emitting device 24 can be accurately controlled to be directed toward the license plate 4. The second reflector 36 (the second optical member) is disposed below the second support plate 32, and includes the reflecting surface 36 which backwardly reflects the infrared light from the second light emitting device 34 toward the region behind the vehicle 2. Thus, the infrared light from the second light emitting device 34 can be accurately controlled to be directed backward toward the region behind the vehicle 2.

Further, the lane mark irradiating lamp 14R includes five sets of the second light emitting device 34 and the second reflector 36 that are arranged side by side in the widthwise direction of the vehicle 2. Each second reflector 36 of the five sets are configured such that, as the location of the second reflector 36 becomes closer to the center of the vehicle 2 in the widthwise direction of the vehicle 2, the optical axis Ax of the second reflector 36 is directed more outwardly in the widthwise direction of the vehicle 2. That is, the light from the second reflector 36 that is located closer to the center of the vehicle 2 in the widthwise direction of the vehicle 2 travels through a space behind any other second reflector 36 that is located at a position more outward in the widthwise direction of the vehicle 2. This makes it possible to make the lighting apparatus 10R more compact.

Further, the first support plate 22, the first light emitting device 24, the first reflector 26, the second support plate 32, the second light emitting device 34, and the second reflector 36 are accommodated inside the same lamp chamber formed between the lamp body 52 and the transparent cover 54. Thus, the lighting apparatus 10R can be made even more compact.

The transparent cover 54 includes the first transparent portion 54a through which the visible light emitted from the first light emitting device 24 and reflected by the first reflector 26 is transmitted, and the second transparent portion 54b through which the infrared light emitted from the second light emitting device 34 and reflected by the second reflector 36 is transmitted. The first transparent portion 54a is arranged to backwardly extend from the location near the lower end of the first support plate 22, the second transparent portion 54b is arranged to downwardly extend from the location near the rear end of the second support plate 32. The second transparent portion 54b includes the lens elements 54s which deflect and diffuse the infrared light in the horizontal direction. According to this configuration, as compared with a case in which the irradiation of the obliquely right region of the road surface behind the vehicle 2 with the infrared light is controlled only by the second reflectors 36, the control of the infrared light becomes easier. While the lens elements 54s are configured to deflect and to diffuse the infrared light in the embodiments described above, the lens elements 54s may alternatively be configured only to deflect the infrared light or only to diffuse the infrared light.

Because the right-side lighting apparatus 10R and the left-side lighting apparatus 10L are disposed symmetric with respect to the center of the vehicle 2 in the widthwise direction of the vehicle 2 and have bilaterally symmetric configuration, the left-side lighting apparatus 10L also has similar advantages as described above in connection with the right-side lighting apparatus 10R.

While the lane mark irradiating lamp 14R includes five sets of the second light emitting device 34 and the second reflector 36 in the embodiments described above, the number of sets of the second light emitting device 34 and the second reflector 36 may be more or less than five and also may be one.

Further, while the license plate lamp 12R is arranged such that, when seen from behind the vehicle 2, the first light emitting device 24 is disposed directly above one of the second light emitting device 34 that is located in the center in the widthwise direction of the vehicle 2 in the embodiments described above, the first light emitting device 24 may be disposed at other positions so long as it is disposed directly above the lane mark irradiating lamp 14R when seen from behind the vehicle 2.

Further, the second light emitting devices 34 of the lane mark irradiating lamp 14R may be continuously turned on or may be intermittently turned on through a pulse control. In the latter case, it is possible to reduce an amount of heat generated by the second light emitting devices 34.

Further, while the lane mark irradiating lamps 14R, 14L have been described above as an example of an infrared irradiation lamp, the present invention is also applicable to a vehicle lighting apparatus having a license plate lamp in combination with other types of infrared irradiation lamps.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A lighting apparatus adapted to be disposed near an upper end edge of a license plate on a rear side of a vehicle, the lighting apparatus comprising:
  a license plate lamp which illuminates the license plate with visible light; and
  an infrared irradiation lamp which irradiates a region behind the vehicle with infrared light,
  wherein the license plate lamp comprises:
    a first support plate comprising a rear surface facing backward;
    a first light emitting device which emits the visible light and is supported on the rear surface of the first support plate; and
    a first optical member which controls the visible light emitted from the first light emitting device so as to be directed toward the license plate,
  wherein the infrared irradiation lamp comprises:
    a second support plate comprising a lower surface facing downward;
    a second light emitting device which emits the infrared light and is supported on the lower surface of the second support plate; and
    a second optical member which controls the infrared rays emitted from the second light emitting device so as to be directed backward toward the region behind the vehicle,
  wherein a lower end of the first support plate is coupled to a rear end of the second support plate, and
  when seen from behind the vehicle, the license plate lamp is disposed directly above the infrared irradiation lamp.

2. The lighting apparatus according to claim 1, wherein the first support plate and the second support plate are formed as a single piece of metallic member.

3. The lighting apparatus according to claim 1,
  wherein the first optical member comprises a first reflecting surface,
  wherein the visible light is backwardly emitted from the first light emitting device and is downwardly reflected by the first reflecting surface,
  wherein the second optical member comprises a second reflecting surface, and
  wherein the infrared light is downwardly emitted from the second light emitting device and is backwardly reflected by the second reflecting surface.

4. The lighting apparatus according to claim 3,
wherein the infrared irradiation lamp comprises a plurality of sets of said second light emitting device and said second reflecting surface,
wherein the plurality of sets are arranged side by side in a widthwise direction of the vehicle, and
wherein the second reflecting surface of each of the sets is configured such that, as a location of the second reflecting surface becomes closer to a center of the vehicle in the widthwise direction of the vehicle, an optical axis of the second reflecting surface is directed more outwardly in the widthwise direction of the vehicle.

5. The lighting apparatus according to claim 4, wherein, when seen from behind the vehicle, the license plate lamp is disposed directly above one second light emitting device in the plurality of sets in the infrared irradiation lamp.

6. The lighting apparatus according to claim 5, wherein, when seen from behind the vehicle, the license plate lamp is disposed directly above the second light emitting device in the plurality of sets in the infrared irradiation lamp that is located in a center in the widthwise direction of the vehicle.

7. The lighting apparatus according to claim 4, wherein the second reflecting surface of the sets that is most outward from the center of the vehicle in the widthwise direction of the vehicle is configured such that an optical axis of the second reflecting surface is directed in the backward direction of the vehicle.

8. The lighting apparatus according to claim 7, wherein the second reflecting surface of the sets that is closest to the center of the vehicle in the widthwise direction of the vehicle is configured such that an optical axis of the second reflecting surface is directed at about a 45° angle with respect to the backward direction of the vehicle.

9. The lighting apparatus according to claim 1, further comprising:
a lamp body which is opened downward; and
a transparent cover which is attached to a lower end portion of the lamp body to form a single lamp chamber,
wherein the first support plate, the first light emitting device, the first optical member, the second support plate, the second light emitting device, and the second optical member are accommodated inside said single lamp chamber.

10. The lighting apparatus according to claim 9, wherein the transparent cover comprises:
a first transparent portion through which the visible light controlled by the first optical member is transmitted; and
a second transparent portion through which the infrared light controlled by the second optical member is transmitted,
wherein the first transparent portion is arranged to backwardly extend from a location near the lower end of the first support plate, and the second transparent portion is arranged to downwardly extend from a location near the rear end of the second support plate, and
wherein the second transparent portion is formed with a plurality of lens elements which deflect and diffuse the infrared light in a horizontal direction.

11. The lighting apparatus according to claim 1, wherein the infrared irradiation lamp irradiates an obliquely sidewise region of a road surface behind the vehicle with the infrared light.

12. A lighting apparatus adapted to be disposed near an upper end edge of a license plate on a rear side of a vehicle, the lighting apparatus comprising:
a license plate lamp which illuminates the license plate with visible light;
an infrared irradiation lamp which irradiates a region behind the vehicle with infrared light;
a lamp body which is opened downward; and
a transparent cover which is attached to a lower end portion of the lamp body to form a single lamp chamber,
wherein the license plate lamp comprises:
a first support plate comprising a rear surface facing backward;
a first light emitting device which emits the visible light and is supported on the rear surface of the first support plate; and
a first optical member which controls the visible light emitted from the first light emitting device so as to be directed toward the license plate,
wherein the first optical member comprises a first reflecting surface, and
wherein the visible light is backwardly emitted from the first light emitting device and is downwardly reflected by the first reflecting surface,
wherein the infrared irradiation lamp comprises:
a second support plate comprising a lower surface facing downward;
a second light emitting device which emits the infrared light and is supported on the lower surface of the second support plate; and
a second optical member which controls the infrared rays emitted from the second light emitting device so as to be directed backward toward the region behind the vehicle,
wherein the second optical member comprises a second reflecting surface,
wherein the infrared light is downwardly emitted from the second light emitting device and is backwardly reflected by the second reflecting surface, and
wherein the infrared irradiation lamp irradiates an obliquely sidewise region of a road surface behind the vehicle with the infrared light,
wherein a lower end of the first support plate is coupled to a rear end of the second support plate,
wherein the first support plate and the second support plate are formed as a single piece of metallic member,
wherein, when seen from behind the vehicle, the license plate lamp is disposed directly above the infrared irradiation lamp, and
wherein the first support plate, the first light emitting device, the first optical member, the second support plate, the second light emitting device, and the second optical member are accommodated inside said single lamp chamber.

13. The lighting apparatus of claim 12, wherein the transparent cover comprises:
a first transparent portion through which the visible light controlled by the first optical member is transmitted; and
a second transparent portion through which the infrared light controlled by the second optical member is transmitted,
wherein the first transparent portion is arranged to backwardly extend from a location near the lower end of the first support plate, and the second transparent portion is arranged to downwardly extend from a location near the rear end of the second support plate, and
wherein the second transparent portion is formed with a plurality of lens elements which deflect and diffuse the infrared light in a horizontal direction.

14. The lighting apparatus of claim 13,
wherein the infrared irradiation lamp comprises a plurality of sets of said second light emitting device and said second reflecting surface,
wherein the plurality of sets are arranged side by side in a widthwise direction of the vehicle, and
wherein the second reflecting surface of each of the sets is configured such that, as a location of the second reflecting surface becomes closer to a center of the vehicle in the widthwise direction of the vehicle, an optical axis of the second reflecting surface is directed more outwardly in the widthwise direction of the vehicle.

15. The lighting apparatus of claim 14, wherein, when seen from behind the vehicle, the license plate lamp is disposed directly above one second light emitting device in the plurality of sets in the infrared irradiation lamp.

16. The lighting apparatus of claim 15, wherein the second reflecting surface of the sets that is most outward from the center of the vehicle in the widthwise direction of the vehicle is configured such that an optical axis of the second reflecting surface is directed in the backward direction of the vehicle.

17. The lighting apparatus of claim 16, wherein the second reflecting surface of the sets that is closest to the center of the vehicle in the widthwise direction of the vehicle is configured such that an optical axis of the second reflecting surface is directed at about a 45° angle with respect to the backward direction of the vehicle.

18. The lighting apparatus of claim 17, wherein, when seen from behind the vehicle, the license plate lamp is disposed directly above the second light emitting device in the plurality of sets in the infrared irradiation lamp that is located in a center in the widthwise direction of the vehicle.

* * * * *